United States Patent
Mutter

(10) Patent No.: US 6,672,340 B2
(45) Date of Patent: Jan. 6, 2004

(54) METHOD FOR FILLING A VEHICLE FUEL TANK WITH GAS

(75) Inventor: Heinz Mutter, Winterthur (CH)

(73) Assignee: GreenField AG, Basel (CH)

( * ) Notice: Subject to any disclaimer, the term of this patent is extended or adjusted under 35 U.S.C. 154(b) by 44 days.

(21) Appl. No.: 10/011,598

(22) Filed: Nov. 5, 2001

(65) Prior Publication Data

US 2002/0053365 A1 May 9, 2002

(30) Foreign Application Priority Data

Nov. 8, 2000 (EP) .......................................... 00811049

(51) Int. Cl.⁷ ................................................. B67C 3/00
(52) U.S. Cl. .............................. 141/4; 141/21; 141/47; 141/49; 141/51; 141/83; 141/94; 141/95; 141/98
(58) Field of Search ........................... 141/2–5, 21, 37, 141/39, 47–49, 51, 83, 94, 95, 98; 137/79, 80; 73/149

(56) References Cited

U.S. PATENT DOCUMENTS

| | | | |
|---|---|---|---|
| 5,479,966 A | | 1/1996 | Tison et al. |
| 5,557,050 A | | 9/1996 | Campain et al. |
| 5,570,729 A | | 11/1996 | Mutter |
| 5,628,349 A | * | 5/1997 | Diggins et al. ................. 141/3 |
| 5,868,176 A | | 2/1999 | Barajas et al. |
| 5,881,779 A | * | 3/1999 | Kountz et al. ................. 141/83 |

* cited by examiner

Primary Examiner—Timothy L. Maust
(74) Attorney, Agent, or Firm—Townsend and Townsend and Crew, LLP

(57) ABSTRACT

A method for filling a vehicle fuel tank with a gas is provided, in which the vehicle fuel tank (31) is connected to a delivery device (2) by a pressure-tight line (10) and the gas stored under pressure is filled into the vehicle fuel tank (31) from a storage unit (3) by means of the delivery device (2). The method comprises the following steps: the instantaneous value of a parameter, which is representative of the instantaneous level of filling of the vehicle fuel tank (31), is determined during filling with the aid of a sensor apparatus (32, 33) arranged in the vehicle fuel tank (31) the filling is ended when the parameter has reached a pre-settable end value.

11 Claims, 2 Drawing Sheets

METHOD FOR FILLING A VEHICLE FUEL TANK WITH GAS

BACKGROUND OF THE INVENTION

The invention relates to a method for filling a vehicle fuel tank with gas by connecting the vehicle fuel tank to a delivery device with a pressure-tight line and filling the gas stored under pressure into the vehicle fuel tank from a storage unit by means of the delivery device.

Gas-fueled motor vehicles are gaining increasing importance as alternatives to conventional motor vehicles powered with liquid fuels such as gasoline or diesel fuel. The fuel typically used as the fuel for gas-fueled vehicles today is compressed natural gas. Modern developments are, however, moving to using gaseous hydrogen as a fuel.

To provide gas-fueled vehicles with a satisfactory range while simultaneously keeping the dimensions of the vehicle fuel tank within reasonable limits, the vehicle fuel tanks are normally filled to high pressures. In the case of natural gas, for example, the vehicle fuel tank is filled to an end pressure of approximately 200 bar with respect to a reference temperature of 15° C. In the case of gaseous hydrogen, even higher end pressures are aimed for, for example 600 bar, which is primarily due to the lower energy density of hydrogen (in comparison with natural gas).

The ambient temperature, among other parameters, is taken into account during filling for a safe refueling with gas. If it is assumed, for instance, that the end temperature for natural gas should be approximately 200 bar at a reference temperature of 15° C., when the ambient temperature is less than 15° C., refueling must be ended at a pressure of less than 200 bar in order to ensure that an impermissibly high pressure does not occur in the vehicle fuel tank when the ambient temperature rises. Conversely, at an ambient pressure of more than 15° C., refueling can take place up to an end pressure of more than 200 bar. The vehicle fuel tanks are therefore designed such that no impermissible pressure arises in the fuel tank even when the ambient temperature fluctuates, provided that the maximum end pressure during refueling corresponds to a pressure of 200 bar at the reference temperature of 15° C.

A gas refueling process and a corresponding device are known, for example, from EP-A-0 653 585 which allow a very simple, and in particular also very fast, refueling of the tank comparable to refueling with gasoline. In accordance with the process proposed there, the vehicle fuel tank is connected to a delivery device via a pressure-tight line and the gas stored under pressure is filled into the vehicle fuel tank from a storage unit by means of a delivery device. First, the permissible end pressure for the instantaneously prevailing temperature is determined. Then a small quantity of gas is filled into the vehicle fuel tank in order to effect a pressure balance between the vehicle fuel tank and the delivery device. The initial pressure prevailing in the vehicle fuel tank is measured in the delivery device after the pressure balance and subsequently a specific mass of gas filled into the vehicle fuel tank. Then the mass flow of the gas is interrupted and the pressure prevailing in the vehicle fuel tank is again measured in the delivery device. A relationship is determined between the mass of the gas delivered and the pressure in the vehicle fuel tank from these pressure values. A mass of gas is calculated on the basis of this relationship such that at least one further mass of gas has to be supplied to fill the vehicle fuel tank to the end pressure. After the calculated mass of gas has been supplied to the vehicle fuel tank, the mass flow is again interrupted and the pressure prevailing in the vehicle fuel tank is determined in the delivery device. The procedures of calculating an additional mass of gas, of supplying this mass of gas and of interrupting the mass flow to determine the pressure are repeated several times until the temperature-adjusted end pressure is reached in the vehicle fuel tank.

SUMMARY OF THE INVENTION

Starting from this prior art, it is an object of the invention to provide a different process for filling a vehicle fuel tank with a gas which allows an even faster and more precise refueling without compromises in safety being required therefor. The process should also be usable for very high end pressures such as are desired in refueling with gaseous hydrogen.

A process for the filling of a vehicle fuel tank with a gas is therefore provided in accordance with the invention in which the vehicle fuel tank is connected to a delivery device via a pressure-tight line and the gas stored under pressure is filled into the vehicle fuel tank from a storage unit by means of the delivery device. The process comprises the following steps:

the instantaneous value of a parameter, which is representative of the instantaneous state of filling of the vehicle fuel tank, is determined during filling with the aid of a sensor arranged in the vehicle fuel tank;

the filling is ended when the parameter has reached a pre-determinable end value.

As the parameter, which is representative of the instantaneous state of filling of the fuel tank, is arranged in the vehicle fuel tank itself, the filling process can be carried out without interruption. The interruptions of the mass flow such as are proposed in EP-A-0-653 585 in order to determine the instantaneous respective pressure prevailing in the vehicle fuel tank in the delivery device are no longer necessary in the process of the invention because the measurement data required for the parameter are determined online in the vehicle fuel tank during the ongoing filling. In this way, the process in accordance with the invention is particularly fast and precise without compromises in safety becoming necessary. Safety is actually increased because the state of filling is determined by means of measurement data determined in the vehicle fuel tank. The detection of the data in the vehicle fuel tank allows an even more precise determination of the state of filling so that the permitted limits for filling can be utilized even more ideally, because they can be used fully without the risk of overstepping any safety limits.

The end value of the parameter at which filling is ended when it is reached is preferably independent of the temperature; that is, a parameter is selected which represents the state of filling of the vehicle fuel tank independently of the temperature. It is particularly preferred to determine the density of gas in the vehicle fuel tank as the parameter. An end value, namely the maximum permitted density or working density, can be given for the end value in the vehicle fuel tank which is independent of the respective prevailing ambient temperature during filling. The temperature-independent end value for the parameter has the advantage that it is no longer necessary to calculate a temperature-adjusted value for the end pressure of the refueling.

A further advantageous measure comprises first determining the parameter before the vehicle fuel tank is filled with gas so that the instantaneous state of filling of the vehicle fuel tank is known as a starting value prior to the start of filling. This starting value serves to compare the instantaneous state of filling determined by measurement in the vehicle fuel tank with the data determined in the delivery device during the refueling process. Discrepancies found during this comparison indicate an error and corresponding countermeasures can be initiated. As is generally the case, the mass of the gas supplied is determined by measurement in the delivery device. This mass of gas supplied is then used to determine a control value corresponding to the parameter while taking the starting value into account; the control value is compared in each case with the parameter and an error message or the aborting of filling takes place if the deviation between the parameter and the control value exceeds a pre-determinable limit value.

Operating safety can be substantially increased during gas refueling by this measure since two different determinations of the instantaneous state of filling of the vehicle fuel tank are carried out. First, the parameter representative of the instantaneous state of filling is determined using the sensor apparatus arranged in the vehicle fuel tank and, second, the control value corresponding to the parameter is determined in the delivery device using the mass of gas supplied determined by measurement there. Defects during filling, for example leaks, can be recognized reliably and at an early point by the respective comparison of these two values.

In accordance with a particularly preferred embodiment, the sensor apparatus arranged in the vehicle fuel tank comprises a temperature sensor and a pressure sensor with which the temperature and the pressure of the gas are measured in the fuel tank. The density of the gas is then determined from these in each case as the parameter.

The method in accordance with the invention is suitable for a plurality of gas refueling plants and in particular for those where compressed natural gas or gaseous hydrogen is filled into a fuel tank.

The invention is explained in more detail below with reference to an embodiment and the drawing.

DESCRIPTION OF THE PREFERRED EMBODIMENTS

Figure 1:
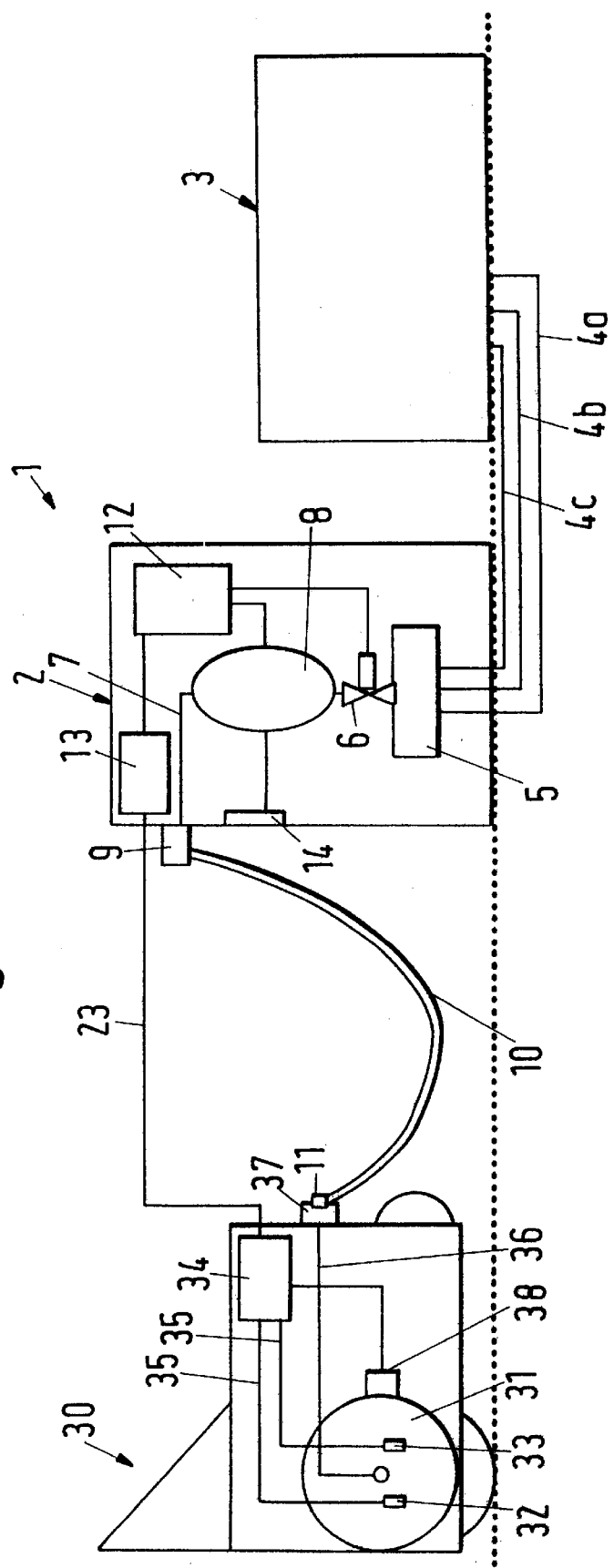
FIG. 1 illustrates the essential parts of a gas refueling plant for carrying out an embodiment of the method in accordance with the invention and a vehicle fuel tank to be filled in a schematic representation.

FIG. 1 shows the essential parts of a gas refueling plant for the carrying out of the method in accordance with the invention in a schematic representation; the totality of the gas refueling plant is designated by the reference numeral 1. Furthermore, a gas-fueled motor vehicle 30 is indicated which has a vehicle fuel tank 31 designed as a pressure vessel. The vehicle fuel tank 31 serves as a storage tank for a gaseous fuel, for example compressed natural gas or gaseous hydrogen, which is required for the powering of the motor vehicle 30. It is understood that the vehicle fuel tank 31 is designed such that it can withstand the end pressure and the usual safety reserves without difficulty. The end pressure here is understood to mean the pressure up to which the vehicle fuel tank 31 is filled during refueling. In the case of natural gas, for example, it is usual to select the end pressure such that it corresponds to a pressure of approximately 200 bar at a reference temperature of 15° C. In the event of hydrogen, the end pressure is normally selected higher, for example 600 bar with respect to the reference temperature of 15° C.

The vehicle fuel tank 31 is connected to a filler neck 37, which is accessible from the outside, via a pressure-tight connection line 36, the filler neck 37 being arranged on the outside of the motor vehicle 30.

A sensor apparatus is provided in the vehicle fuel tank 31 which, in the embodiment described here, comprises a pressure sensor 32 and a temperature sensor 33 with which the instantaneous pressure and the instantaneous temperature can be determined by measurement in the vehicle fuel tank 31. The sensors 32, 33 are connected to an electronic module 34, which is provided outside the vehicle fuel tank 31, but inside the motor vehicle 30, via lines 35. The electronic module 34 receives the measurement values detected by the sensors and processes them. Furthermore, the electronic module 34 transmits data to the gas refueling plant 1.

The volume of the vehicle fuel tank 31, which is a constant value, is stored in a memory 38. The volume can be transmitted to the electronic module 34 via a signal line. It is naturally also possible to store the volume of the vehicle fuel tank 31 directly in the electronic module 34.

The gas refueling plant 1 shown only with its essential parts comprises a delivery device 2 and a stationary storage unit 3 in which the gas is stored for refueling, for example natural gas or gaseous hydrogen. Furthermore, a compression device (not shown in detail) is provided which fills the storage unit 3 back up with gas as required. Normally, the storage unit comprises a plurality of storage tanks, here three storage tanks, each of which is connected to the delivery device 2 via a separate pressure-tight connection line 4a, 4b or 4c.

The delivery device 2 comprises a change-over device 5 to which the three connecting lines 4a, 4b and 4c are connected. A pressure-tight line 7 extends from the change-over device 5 to the outlet 9 of the delivery device 2 via a valve which is preferably designed as a solenoid valve and via a mass flowmeter 8 connected after the solenoid valve 6. A pressure-tight line 10 is connected to the outlet 9 and is provided at its other end with a coupling 11 which is connectable to the filler neck 37 of the motor vehicle 30.

The delivery device further comprises a communication module 13, an evaluation and regulation unit 12 and an operating module 14. The gas refueling plant can be put into operation or operated by the operating module 14 via corresponding entries. The operating module 14 further comprises a display unit on which, for example, the mass of the refueled gas or the price for the gas can be displayed.

The communication module 13 receives data from the electronic module 34 of the motor vehicle 30 and forwards them to the evaluation and regulation unit 12 via a signal line. The evaluation and regulation unit 12 is further connected to the mass flowmeter 8 via signal lines and to the solenoid valve 6.

The solenoid valve 6 is an electromagnetically actuated valve which is controlled by signals coming from the evaluation and regulation unit 12. The flow connection for the gas between the change-over device 5 and the outlet 9 can be opened or closed by means of the solenoid valve 6 so that the filling process can be started or ended by actuating the solenoid valve 6.

The mass flowmeter 8 is preferably a measuring instrument which is based on the Coriolis principle. Such Coriolis mass flowmeters are sufficiently known per se. They are used to measure the mass of the gas supplied during refueling.

The change-over device 5 serves to connect one of the connecting lines 4a or 4b or 4c respectively to the line 7. If, for example, the connecting line 4a is connected to the line 7 and if the pressure in the storage tank of the storage unit 3 falls so far during refueling that the mass flow of the gas becomes too low, a change over to a different storage tank can be made with the change-over device 5 by connecting the line 7 to the connecting line 4b or 4c.

Reference is made to the already cited EP-A-0 653 585 with respect to further details and embodiments. Such gas refueling plants are described in detail there, with the exception of the communication module.

The communication module 13 receives data, for example measurement data or the volume of the vehicle fuel tank 31, from the electronic module 34 of the motor vehicle 30. The communication module 13 is connected by signal to the electronic module 34 for this purpose. This can be done, for example, via a signal line 23. It is also possible to integrate the signal line 23 in the pressure-tight line 10, for example to arrange the signal line 23 at the outside of the line 10. It is furthermore possible to design the signal connection between the electronic module 34 and the communication module 13 in a wireless manner, for example by means of radio or of optical methods such as infrared signals.

The method in accordance with the invention is based on determining the instantaneous value of a parameter, which is representative of the instantaneous state of filling of the vehicle tank 31 during filling with the help of the sensor apparatus which is arranged in the vehicle fuel tank 31; that is, the instantaneous state of filling of the vehicle fuel tank 31 is determined by measurements in the actual vehicle fuel tank 31.

In the following, an embodiment of the method in accordance with the invention is explained in more detail with reference to the flow chart shown in FIG. 2. In this embodiment, the density p of the gas in the vehicle fuel tank 31 is used as the parameter. This parameter, also known as the working density, has the advantage that a maximum permitted end value can be given for it which is independent of the respective prevailing temperature. It is thus no longer necessary to calculate a pressure which is dependent on the ambient temperature prevailing during refueling and at which refueling is ended. In previously known methods, the temperature-dependent end pressure for the filling has, for example, to be calculated from the isochore behavior of the gas. In the method proposed here, a maximum permitted end value can be pre-set for the density of the gas and the filling can then be continued—independent of the respective prevailing ambient temperature—until this end value is reached for the density in the vehicle fuel tank 31.

The instantaneously prevailing density of the gas in the vehicle fuel tank is determined constantly during filling. It is particularly advantageous with respect to operating safety to determine this density in two different ways in each case, namely first with the aid of the measuring values of the sensors 32, 33 arranged in the vehicle fuel tank 31 and, second, with the aid of the mass of gas supplied by the delivery device 2 which is measured in the delivery device by means of the mass flowmeter 8. If these two values deviate from one another by more than a pre-settable limit value for the density, then this indicates a defect. For example, a leak can have occurred or on e of the sensors 32, 33 is not working properly. Dangerous states such as the overfilling of the vehicle fuel tank 31 can thus also be avoided by means of this two-fold determination of the density in each case.

The following applies for the density PT of the gas in the vehicle fuel tank 31:

$$\rho_T = m_T/V$$

where $m_T$ is the mass of the gas in the vehicle fuel tank 31 and V is the volume of the vehicle fuel tank 31, which is a constant value.

On the other hand, the gas equation results in $$m_T V = p_T/(z \cdot R \cdot T_T)$$

where $p_T$ is the pressure in the fuel tank, z the real gas factor, which is a value specific to the gas and dependent on pressure and temperature, R the general gas constant and $T_T$ the temperature of the gas in the fuel tank. The instantaneous density $\rho_T$ in the vehicle fuel tank 31 can therefore be determined by measuring the temperature $T_T$ and the pressure $p_T$ in the vehicle fuel tank 31 by means of the temperature sensor 33 and the pressure sensor 32. The respective value for the real gas factor z can be taken, for example, from a stored table as a function of the pressure and the temperature.

For the refueling of the motor vehicle 30, the pressure-tight line 10 of the delivery device 2 is connected to the filler neck 37 of the motor vehicle 30 by means of the coupling 11. Furthermore, the signal line 23 is optionally connected to the electronic module 34 at one end and to the communication module 13 at the other. Before the vehicle fuel tank 31 is filled with gas, a measurement of the starting pressure $p_0$ and the starting temperature $T_0$ respectively, which prevail in the vehicle fuel tank 31 prior to the start of filling, is made by means of the pressure sensor 32 and the temperature sensor 33 respectively (Step 101 in FIG. 2). Then, in Step 102, the density $\rho_0$ is determined as the starting value from $p_0$ and $T_0$ and the corresponding value for the real gas factor z. $\rho_0$ indicates the instantaneous density of the gas in the vehicle fuel tank 31 prior to the start of filling. The electronic module 34 transfers the value of $\rho_0$ and the volume V of the vehicle fuel tank 31 to be filled to the communication module 13 of the delivery device 2.

The starting mass $m_0$ of the gas in the vehicle fuel tank 31 is determined in the delivery device 2, preferably in the evaluation and regulation unit 12, from the volume V of the vehicle fuel tank 31 and the starting value $\rho_0$ in accordance with the relationship $$m_0 = \rho_0 \cdot V.$$

The starting value $m_0$ therefore indicates the mass of the gas that is present in the vehicle fuel tank 31 prior to the start of filling.

Figure 2:
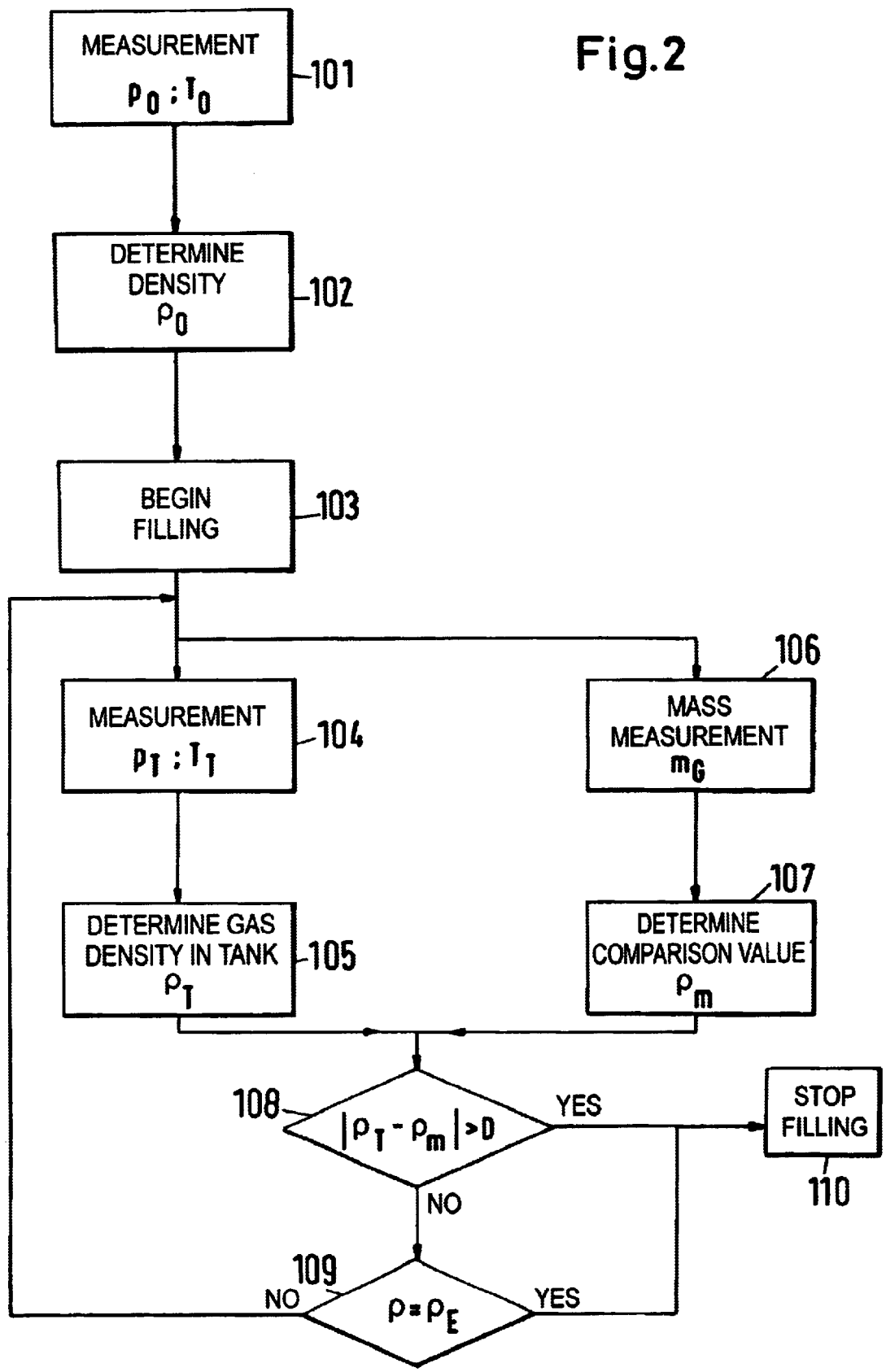
FIG. 2 is a flow chart to illustrate the embodiment of the method in accordance with the invention.

The process of filling now begins in Step 103 (FIG. 2). The evaluation and regulation unit 12 opens the solenoid valve 6 and the gas can flow out of the storage unit 3 through the mass flowmeter 8, the pressure-tight line 10 and the connecting line 36 and into the vehicle fuel tank 31. During the filling process, the pressure sensor 32 and the temperature sensor 33 measure the respective instantaneous pressure $p_T$ and the respective instantaneous temperature $T_T$ in the vehicle fuel tank 31 either constantly or in short time intervals (Step 104). The instantaneous value $\rho_T$ for the density of the gas in the vehicle fuel tank 31 in accordance with the relationship given above is determined in Step 105 and transmitted to the delivery device 2.

During the filling process, the mass $m_G$ of the gas supplied is constantly detected by measurement in the delivery device by means of the mass flowmeter (Step 106). This is done, for example, at a rate of approximately one hundred pulses (measurements) per kilogram of gas supplied. The evaluation and regulation unit 12 of the delivery device 2 determines a comparison value $\rho_m$ in Step 107 as a control value for the density of the gas in the vehicle fuel tank. This is done with the aid of the volume V of the vehicle fuel tank 31, the starting mass $m_0$ of the gas in the vehicle fuel tank and the respective instantaneous value of the mass $m_G$ of the gas supplied in accordance with the relationship $$\rho_m = (m_0 + m_G)/V$$

In Step 108, the control value $\rho_m$ is then compared with the density $\rho_T$ determined in the vehicle fuel tank 31. If the deviation between the control value $\rho_m$ and the density $\rho_T$ determined in the vehicle fuel tank exceeds a pre-settable limit value D, filling is ended (Step 110) and/or an error message is output. Otherwise, a check is made in Step 109 as to whether the density $\rho$ of the gas in the vehicle fuel tank 31 has reached a pre-settable end value $\rho_E$. As it is already certain that $\rho_T$ and $\rho_m$ differ by a maximum of D when Step 109 is reached, it is basically irrelevant whether $\rho_T$ or $\rho_m$ is used for the comparison with the end value $\rho_E$. The mean value or a weighted mean value of $\rho_T$ and $\rho_m$ can naturally be used for the comparison with $\rho_E$. If the density $\rho$ has reached the end value $\rho_E$, filling is ended in Step 110, otherwise filling is continued.

An advantage of this method described is that the maximum permitted density or working density $\rho_E$ for a given gas is independent of the ambient temperature at which refueling takes place.

A further advantage, particularly with respect to safety, is that the density of the gas in the vehicle fuel tank is determined in two different ways.

It is possible in principle that, for example, one of the two sensors 32, 33 arranged in the vehicle fuel tank is faulty before refueling begins. This then also results, among other things, in the starting mass $m_0$ of the gas being calculated incorrectly and consequently also in the control value $\rho_m$ determined in the delivery device being incorrect. As, however, the starting values, $p_0$ for the pressure and $T_0$ for the temperature, determined by the sensors 32, 33 in the vehicle fuel tank 31 only enter into the respective determination of the control value $\rho_m$ as a starting condition, the values for the density $\rho_T$ determined in the fuel tank on the one hand, and the values for the control value $\rho_m$ on the other, diverge more and more as the filling continues so that such errors are also recognized before a hazardous overfilling of the vehicle fuel tank 31 occurs.

It is understood that the respective calculation of the density $\rho_T$ does not have to be carried out in the motor vehicle. It is also possible for the electronic module 34 to transmit the measurement values or the data of the temperature sensor 33 and of the pressure sensor 32, that is, for example, $p_0$, $T_0$, $p_T$, $T_T$, to the delivery device and for the respective determination of $\rho_0$ and $\rho_T$ to be carried out there.

What is claimed is:

1. A method for filling a vehicle fuel tank with gas from a storage unit holding the gas under pressure by directing gas from the storage unit via a delivery device and a pressure-tight line to the fuel tank, comprising flowing gas from the storage unit into the fuel tank, arranging a sensor apparatus in the fuel tank, with the sensor apparatus determining an instantaneous value of a first parameter which is representative of an instantaneous state of filling of the vehicle tank with gas, during filling detecting at the delivery device a mass of the gas supplied to the tank, from the supplied mass generating a control value that is comparable to the first parameter, comparing the control value with the first parameter, generating an error signal when a deviation between the first parameter and the control value exceeds a pre-settable limit value, and ending the filling when the first parameter has reached a pre-settable end value.

2. A method in accordance with claim 1 wherein the end value of the parameter is independent of the temperature.

3. A method in accordance with claim 1 wherein the first parameter is determined, before the vehicle fuel tank is filled with gas, so that the instantaneous state of filling of the vehicle fuel tank is known as a starting value before filling begins.

4. A method according to claim 1 wherein flowing takes place without interruption until the control value exceeds the pre-settable limit value.

5. A method in accordance with claim 1 wherein a density of the gas in the vehicle fuel tank is determined as the first parameter.

6. A method in accordance with claim 1 wherein the sensor apparatus arranged in the vehicle fuel tank comprises a temperature sensor and a pressure sensor with which the temperature and the pressure of the gas in the fuel tank is measured and a density of the gas is determined therefrom as the first parameter.

7. A method in accordance with claim 5 wherein: the density is determined before the vehicle fuel tank is filled with gas, so that the instantaneous density of the gas in the vehicle fuel tank is known as a starting value before filling begins; the volume of the vehicle fuel tank to be filled is transmitted to the delivery service; and a starting mass of the gas in the vehicle tank prior to the start of filling is determined from the volume and the starting density.

8. A method in accordance with claim 7 including determining a comparison value for the density of the gas in the vehicle fuel tank in the delivery device with the aid of the volume of the vehicle fuel tank the starting mass of the gas in the vehicle fuel tank and the mass determined by measurement of the gas supplied, and using said comparison value as a control value and comparing said comparison value in each case with the density determined in the vehicle fuel tank.

9. A method in accordance with claim 8 wherein filling is ended when the density reaches a pre-settable end value or when the deviation between the control value and the density determined in the vehicle fuel tank exceeds a pre-settable limit value.

10. A method according to claim 1 wherein flowing takes place without interruption until the first parameter has reached the pre-settable end value.

11. A method of operating a gas refueling plant including a storage unit holding gas under pressure, a delivery device for dispensing the gas from the storage unit, and a pressure-tight line for directing gas from the delivery device to a fuel tank, the method comprising flowing gas from the delivery device through the pressure-tight line to the fuel tank, arranging a sensor apparatus in the fuel tank, with the sensor apparatus determining an instantaneous value of a first parameter which is representative of an instantaneous state of filling of the vehicle tank with gas, during filling detecting at the delivery device a mass of the gas supplied to the tank, from the supplied mass generating a control value that is comparable to the first parameter, comparing the control value with the first parameter, generating an error signal when a deviation between the first parameter and the control value exceeds a threshold value, and ending the filling when the first parameter has reached a pre-settable end value.

* * * * *